(12) United States Patent
Pringnitz (10) Patent No.: US 7,246,683 B2
(45) Date of Patent: Jul. 24, 2007

(54) TREE STAND WITH BACK SUPPORT

(76) Inventor: Todd A. Pringnitz, 18003 Dogwood Dr., Spring Lake, MI (US) 49456

( * ) Notice: Subject to any disclaimer, the term of this patent is extended or adjusted under 35 U.S.C. 154(b) by 241 days.

(21) Appl. No.: 10/940,254

(22) Filed: Sep. 14, 2004

(65) Prior Publication Data
US 2006/0054397 A1   Mar. 16, 2006

(51) Int. Cl.
A01M 31/00 (2006.01)
(52) U.S. Cl. .................................... 182/187
(58) Field of Classification Search .............. 182/187, 182/188, 135, 136, 116; 297/284.4–284.8, 297/230.14
See application file for complete search history.

(56) References Cited

U.S. PATENT DOCUMENTS

| | | | | |
|---|---|---|---|---|
| 2,304,349 A * | 12/1942 | Fox | | 297/230.14 |
| 4,236,602 A * | 12/1980 | Leggett | | 182/187 |
| 4,579,198 A * | 4/1986 | Lee | | 182/115 |
| 4,640,548 A * | 2/1987 | Desanta | | 297/300.3 |
| 4,981,325 A * | 1/1991 | Zacharkow | | 297/284.1 |
| 5,253,732 A * | 10/1993 | Daniels | | 182/116 |
| 5,385,388 A * | 1/1995 | Faiks et al. | | 297/301.3 |
| 5,439,074 A | 8/1995 | Trout et al. | | |
| 5,450,927 A | 9/1995 | Harton et al. | | |
| 5,685,393 A | 11/1997 | Early | | |
| 5,695,099 A * | 12/1997 | Strum | | 224/155 |
| 5,730,688 A * | 3/1998 | Prusick | | 482/130 |
| 5,775,464 A | 7/1998 | Gardner | | |
| 5,826,940 A * | 10/1998 | Hodgdon | | 297/303.1 |
| 5,937,969 A | 8/1999 | Woller et al. | | |
| 5,971,104 A | 10/1999 | Woller | | |
| 6,267,202 B1 | 7/2001 | Nelson | | |
| 6,308,800 B1 | 10/2001 | Graham, Jr. | | |
| 6,308,801 B1 | 10/2001 | Futch | | |
| 6,668,976 B2 | 12/2003 | Graham, Jr. et al. | | |
| 6,695,404 B2 * | 2/2004 | Bruske | | 297/316 |
| 6,698,549 B2 | 3/2004 | Graham, Jr. et al. | | |
| 6,883,644 B1 * | 4/2005 | Braun et al. | | 182/187 |
| 2003/0020316 A1 | 1/2003 | Wilhelm | | |
| 2003/0029671 A1 | 2/2003 | Voorhies | | |
| 2003/0107250 A1 * | 6/2003 | Staarink | | 297/284.7 |

FOREIGN PATENT DOCUMENTS

GB        2165445 A  *  4/1986

* cited by examiner

Primary Examiner—Alvin Chin-Shue
(74) Attorney, Agent, or Firm—Price, Heneveld, Cooper, DeWitt & Litton LLP (57) ABSTRACT

A tree stand for hunting includes a frame constructed to stably engage a tree trunk in an elevated position, a seat pivoted to the frame, and a back support pivotally supported by a link mechanism to a telescoping upright of the frame above the seat. Vertical and angular adjustment of the back support allows the hunter to adjust the back support for optimal ergonomic lumbar support and for user preference. Further, the back support and seat can be pivotally adjusted to provide a partial-standing perched position for the hunter. Also, the tree stand can be folded flat for storage and transport.

13 Claims, 10 Drawing Sheets

TREE STAND WITH BACK SUPPORT

BACKGROUND

The present invention relates to tree stands having a back support.

Hunters that use tree stands often spend hours in their stands waiting for prey. During this time, they must remain extremely quiet and also limit their movement in order to avoid spooking prey. This can be very hard on a hunter's back. For these reasons, it is desirable to provide hunters with a tree stand that provides good back support, including the ability to adjust the tree stand to better fit their particular body shape and preferences in a lumbar region of their torso. However, adjustability often adds weight to a tree stand, which is undesirable because the tree stand must be transported to a hunting site, then lifted and anchored to a tree several feet in the air. Further, adjustability often adds joints to the tree stand that reduce a rigidity in the frame of the tree stand, which is undesirable because non-rigid tree stand frames twist and distort such that they are less stable. Also, improperly-designed joints tend to squeak and make noise even with minor movement of the hunter.

In addition, the tree stand should preferably be mechanically simple, and be easy and intuitive to adjust. Yet it also should provide substantial adjustability for meeting user needs and preferences, and be low-cost, robust, and durable to withstand harsh outdoor environments and conditions. Also, the tree stand should preferably be made of materials that minimize noise when sitting on the tree stand and also when adjusting the tree stand. Still further, the tree stand must be flexible for installation on tree trunks that vary in size, shape, and that have non-perfect surfaces.

Thus, a tree stand with back support is desired having the aforementioned advantages and solving the aforementioned problems.

SUMMARY OF THE PRESENT INVENTION

In one aspect of the present invention, a tree stand for hunting includes a frame constructed and adapted to stably engage a tree trunk in an elevated position on the tree trunk, a seat on the frame, and a back support movably supported on the frame above the seat. In a narrower form, the back support is both angularly and vertically adjustable, allowing the hunter to adjust the back support for optimal ergonomic support and for user preference.

In another aspect of the present invention, a tree stand includes a frame adapted to stably engage a tree trunk at an elevated position, the frame including an upright. The tree stand further includes a seat on the frame, and a back support supported on the upright. The upright includes an upper section defining a recess into which the back support fits so that, when the back support is in the recess, a front center surface of the back support aligns with a front surface of the upright.

In another aspect of the present invention, a tree stand includes a frame adapted to stably engage a tree trunk at an elevated position, a seat on the frame, and a back support. The frame includes an upright extending above the seat and a back support operably supported on the upright. The back support is movable to a vertical position relative to the seat for supporting a seated user in a low-seated position and is rotatable to a horizontal position relative to the seat for supporting a seated user in a higher-perched position.

In still another aspect of the present invention, a tree stand includes a frame adapted to stably engage a tree trunk at an elevated position, a seat on the frame, and a back support. The frame includes an upright extending above the seat. A back support is adjustable pivotally supported on the upright, the back support including a lumbar-supporting section adapted to engage and support a lumbar region of a user's back.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
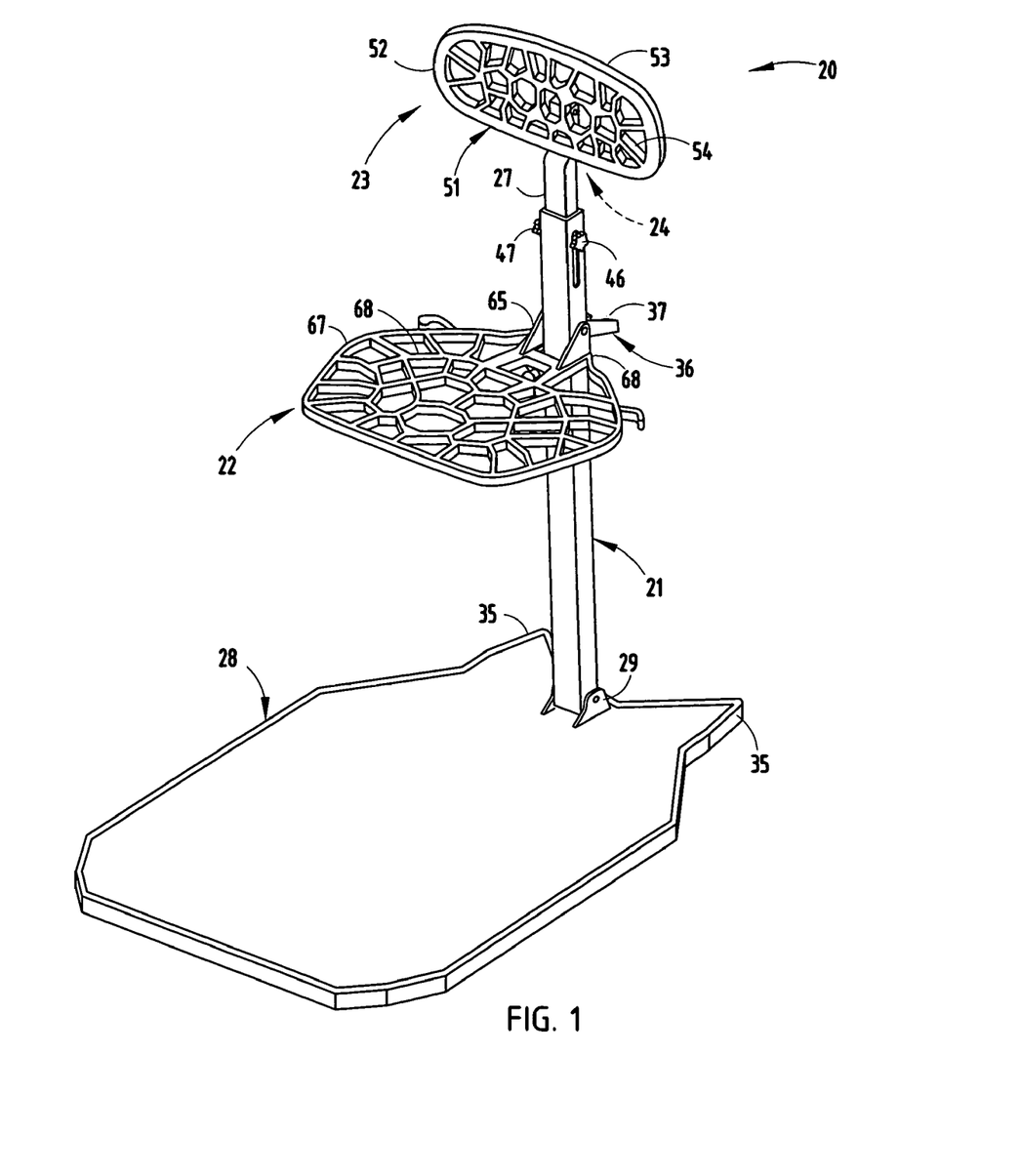
FIG. 1 is a perspective view of the present tree stand.
Figure 2:
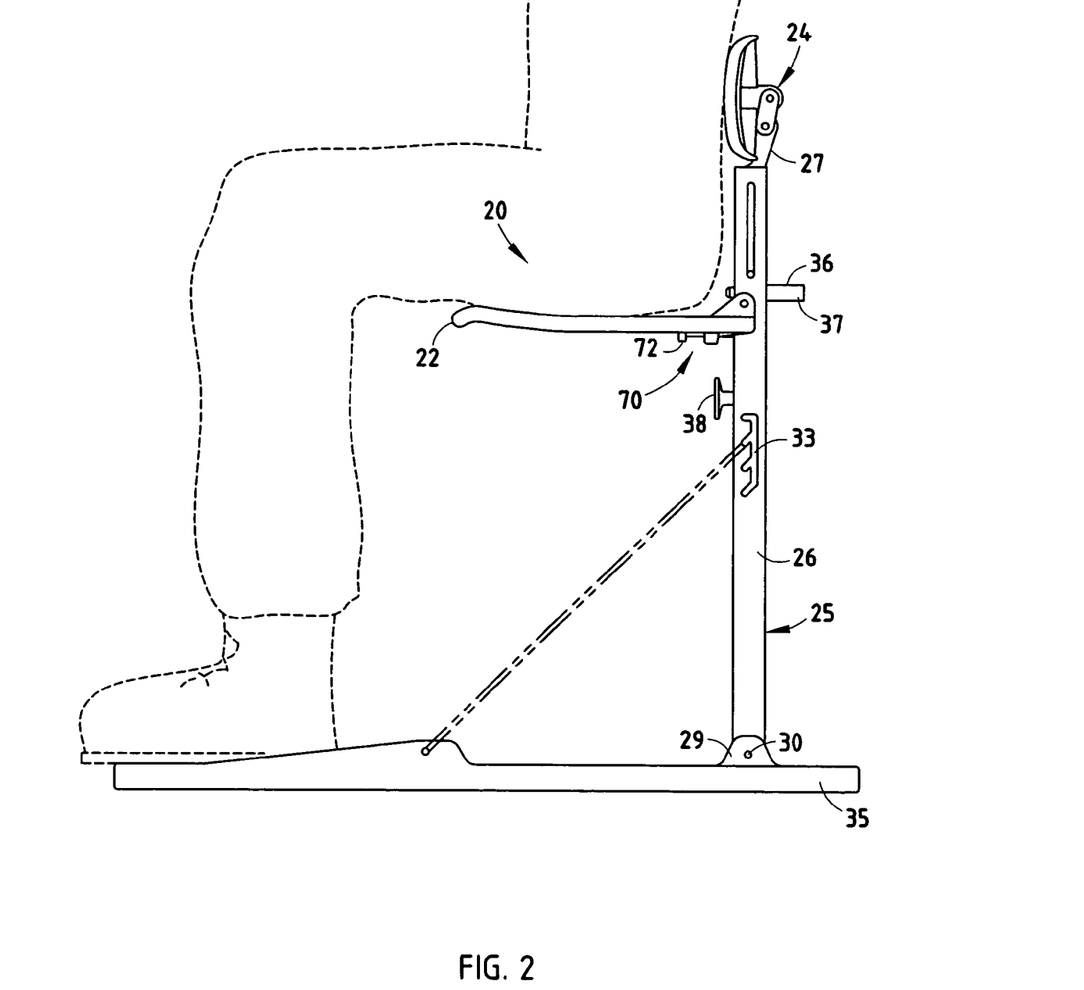
FIG. 2 is a side view of the tree stand of FIG. 1 with the back support in a vertically-lowered position.
Figure 3:
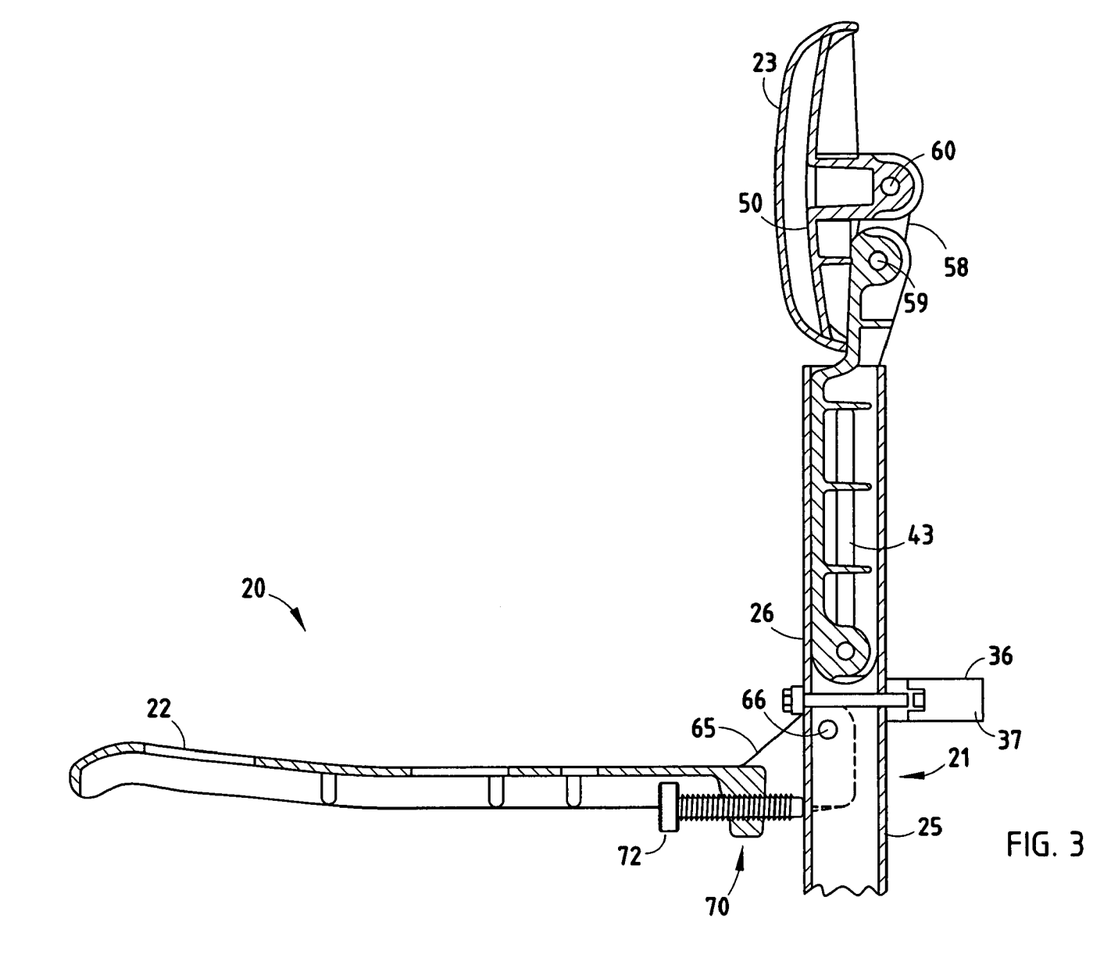
FIGS. 3 and 4 are vertical cross-sectional views of FIGS. 2 and 2A showing internal construction of the back support and telescoping upright for the back support, FIG. 3 showing the lowered position and FIG. 4 showing the raised position.

A tree stand 20 (FIGS. 1-3) for hunting includes a frame 21 constructed to stably engage a tree trunk in an elevated position. A seat 22 is pivoted to the frame 21, and a back support 23 is pivotally supported by a link mechanism 24 to a telescoping upright 25 of the frame 21 above the seat 22. Vertical and angular adjustment of the back support 23 allows the hunter to adjust the back support 23 for optimal ergonomic support and for user preference. Further, the back support 23 and seat 22 can be pivotally adjusted to a partial-standing perched position (FIG. 7), thus providing added flexibility for the hunter's comfort. Also, the tree stand 20 can be folded (FIG. 8) flat for storage and transport. Notably, although the term "hunter" is used herein, it is contemplated that the present device can be used by nature-observers, such as bird watchers, natural photographers, and the like. Thus, the term "hunter" as used herein is intended to cover these modern non-killing "hunters" as well as gun hunters and bow-and-arrow hunters.

Figure 2A:
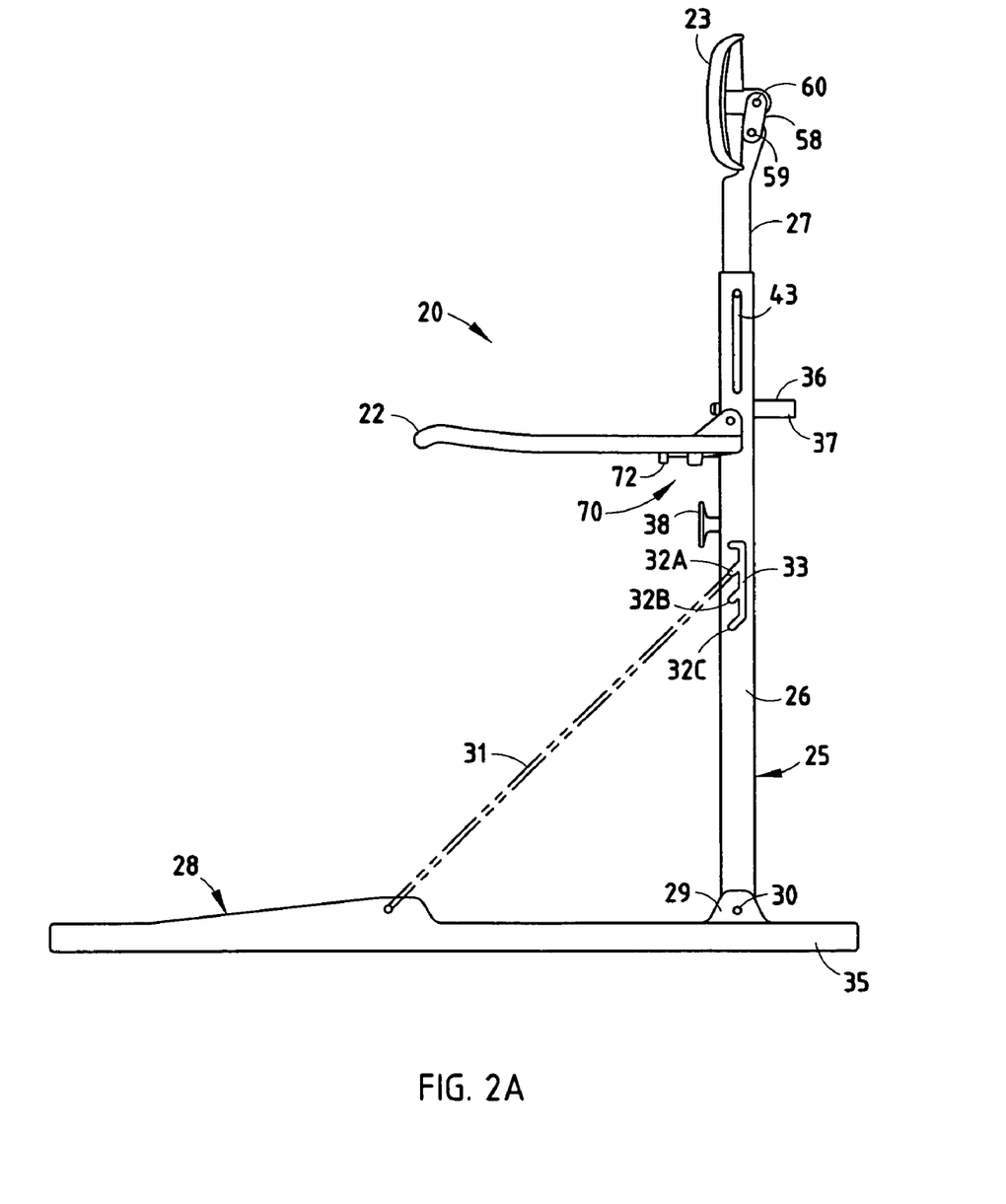
FIG. 2A is a side view similar to FIG. 2 but with the back support adjusted to an elevated raised position.

The frame 21 (FIG. 2A) includes an upright 25 comprising an outer tube section 26 of about 1" to 1½" on each side and a mating upper section 27 shaped to telescopingly engage the outer tube section 26. A foot-supporting platform 28 includes a pair of parallel flanges 29 and is pivoted to the upright 25 by a pivot pin 30 that extends through the flanges 29 and a lower end of the upright 25. A tension cable or wire 31 (FIG. 2) is connected to a front portion of the platform 28 and extends diagonally upwardly into a selected side slot 32A. There are three illustrated side slots 32A-32C, however more or less could be used. The slots 32A-32C are interconnected by a main vertical slot 33. By sliding the wire 31 out of the selected side slot 32A-32C and into the main slot 33, a top of the wire 31 can be repositioned. This in turn allows the foot platform 28 to be adjusted to different angled positions.

A rearward edge of the platform 28 defines spaced-apart protrusions 35 at a lower part of the tree stand 20, and a bracket 36 attached to the upright 25 just above the seat 22 includes a second pair of spaced-apart protrusions 37 at a higher region. A forwardly-extending knob or anchor 38 is positioned just under the seat 22, slightly below the upper protrusions 37. The protrusions 35 and 37 form a pattern of protrusions shaped to stably bite into and engage a tree trunk, when an anchoring strap is extended around the tree trunk and secured at both ends to the anchor 38.

Figure 1A:
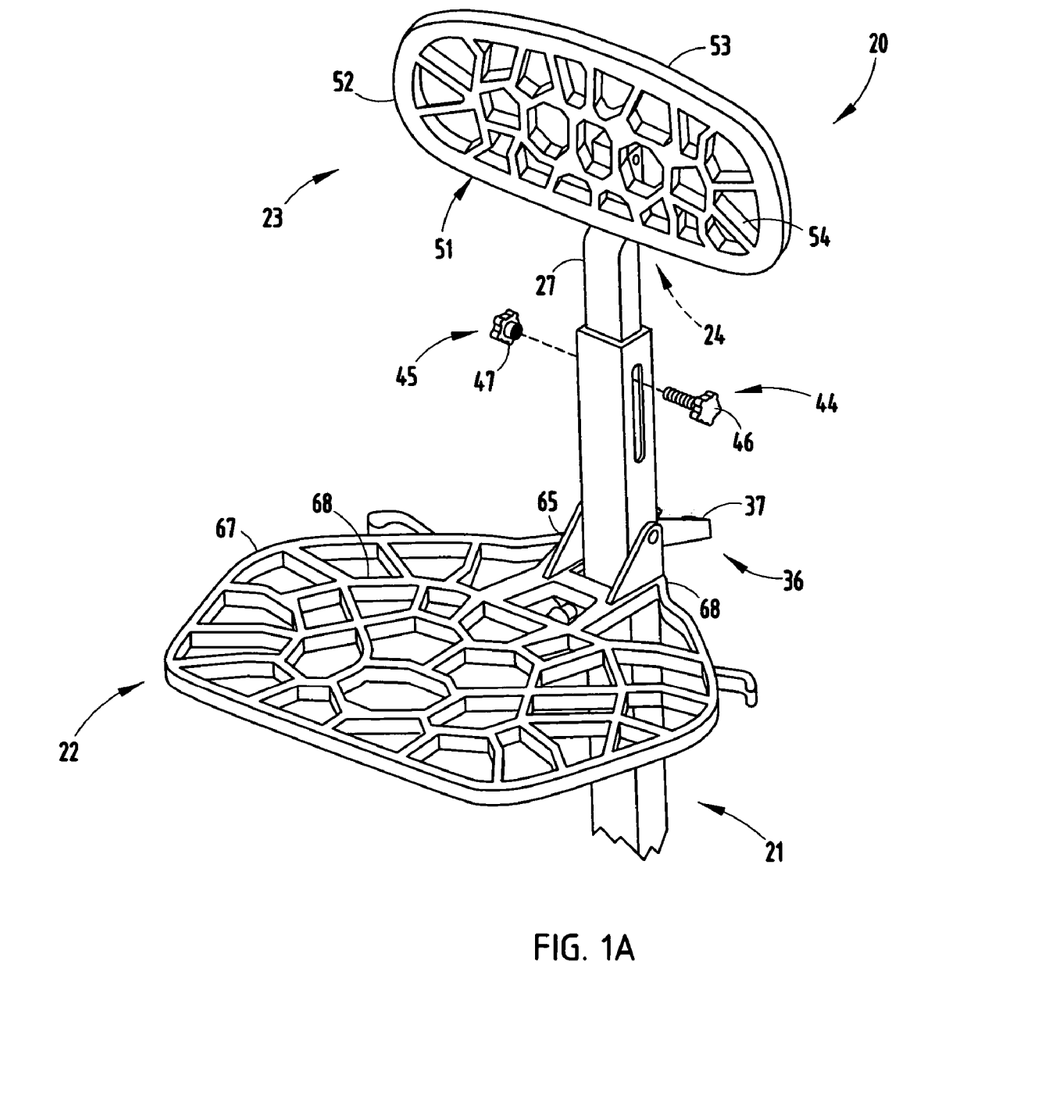
FIG. 1A is an enlarged exploded view of an upper portion of FIG. 1A.
Figure 4:
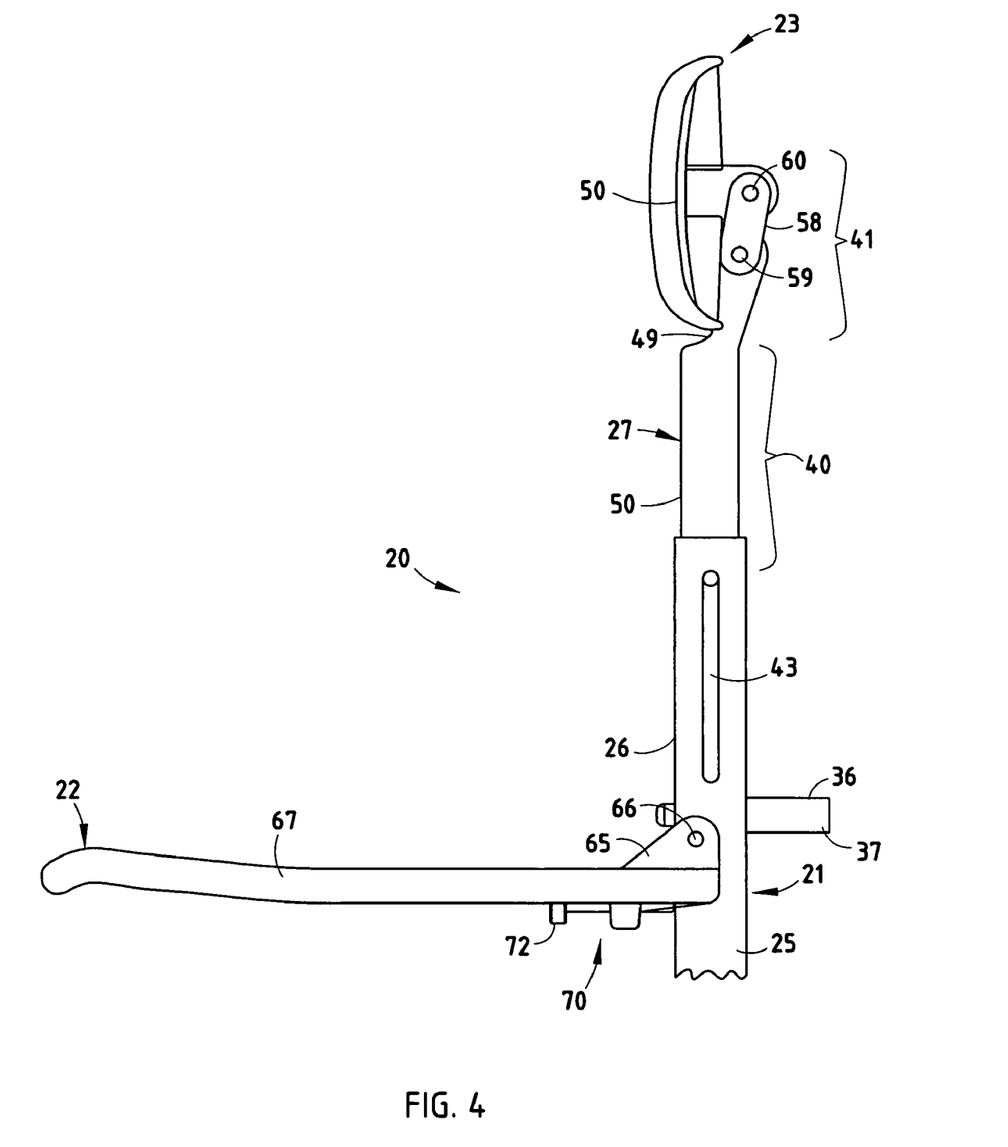

It is contemplated that the telescoping upright 25 can be a variety of different constructions. In the preferred embodiment, the upper section 27 (FIG. 4) includes a telescoping part 40 with ribs shaped to provide a smooth bearing surface shaped to closely slidingly engage an internal cavity of the outer tube section 26, and further includes an offset upper part 41 molded of plastic with ribs for stiffness and that extends upwardly from the top end of the outer tube section 26. A top of the upper part 41 is enlarged to create a knob. It is contemplated that this knob can be made large enough to engage a tree trunk for added stability, if desired. The telescoping part 40 includes a transverse hole 42 in its bottom region, and the outer tube section 26 includes vertically-elongated slots 43 aligned with the hole 42. A clamp for securing the telescoping sections 26 and 27 together includes a shoulder screw 44 on one side and a mating shoulder nut 45 (FIG. 1A) on the other side. The screw 44 and nut 45 include knobs 46 and 47 forming handles. The screw 44 and nut 45 extend through the hole 42 and slots 43 into threaded mating engagement. As the screw 44 is rotated into nut 45, the associated side walls of the telescoping sections 26 and 27 are forced toward each other and frictionally engage to hold the telescoping sections 26 and 27 together at a fixed selected length. The illustrated back support 23 can be vertically adjusted up to about 3-7 inches, and more preferably about 4 inches.

The offset upper part 41 (FIG. 4) is offset rearwardly from the lower telescoping part 40 to create a recess or notch 49. As a result, when the lower part of the back support 23 is positioned in the recess 49, a center front surface 50 of the back support 23 is approximately one-half inch behind the front surface of the outer tube section 26. A ⅜" thick foam pad is applied to a face of the back rest, thus providing a support surface that is continuous. This allows a seated user to simultaneously rest their back/torso against both front surfaces 49 and 50 at the same time. This provides a "vertically-extended" surface for supporting the seated user, such that support to a seated user's back is provided by the back support 23 as well as below the back support 23 (by the front surface of the upright 25). Notably, the back support 23 has a "potato chip"-like shape and has a vertical cross section that is slightly forwardly concave along its centerline, and has a horizontal cross section that is slightly forwardly convex at mid-height for improved lumbar support and comfort. Also, the back support 23 has a lightweight, honeycomb-appearing frame 51 (FIG. 1) formed by a perimeter flange 52, a centered mount 53, and radiating pattern of reinforcing walls 54 interconnecting the perimeter flange 52 and mount 53. Also, a cushion is positioned on a front of the back support frame 51 (or is molded thereon), and a camouflage-patterned fabric is used to cover (and capture) the cushion on the frame 51.

Figure 5:
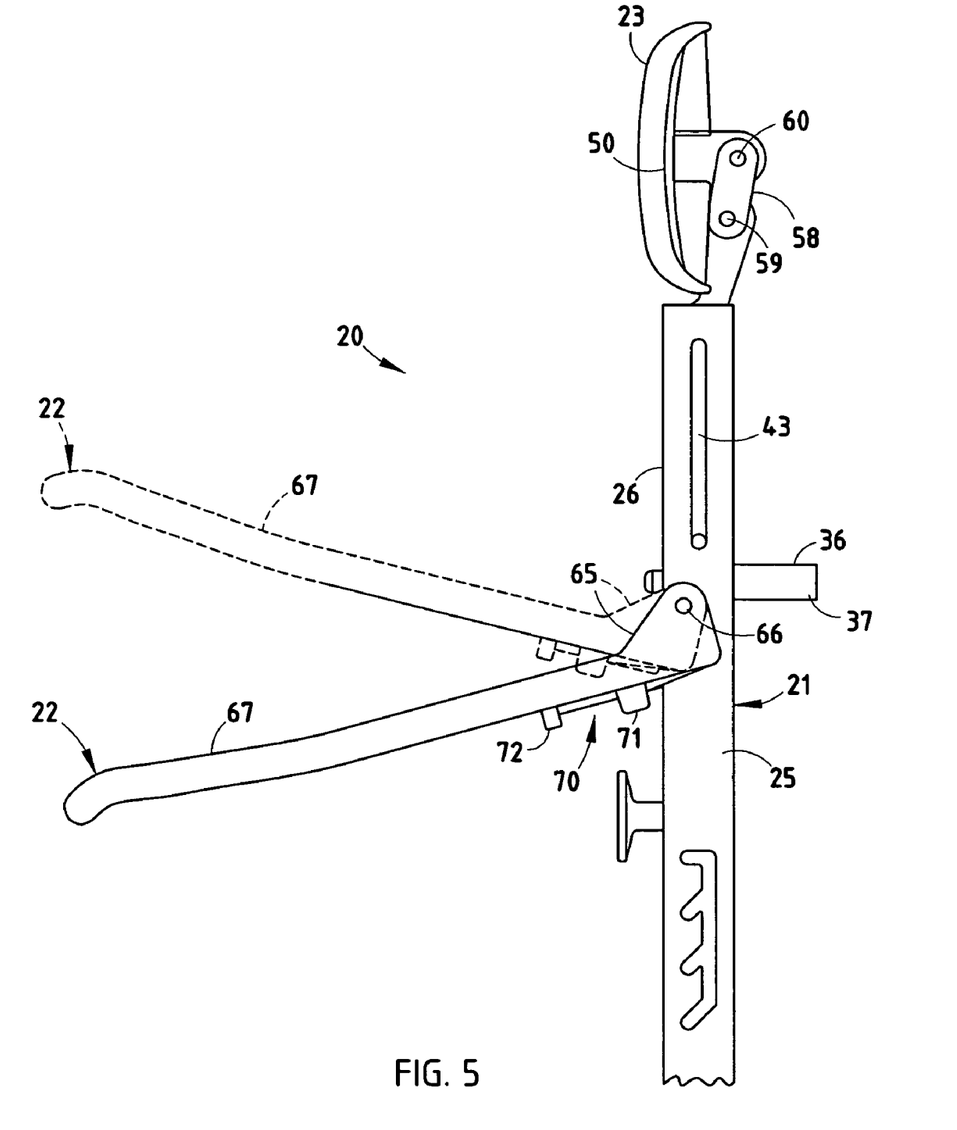
FIG. 5 is a side view of FIG. 2 showing angular adjustment of the seat.
Figure 6:
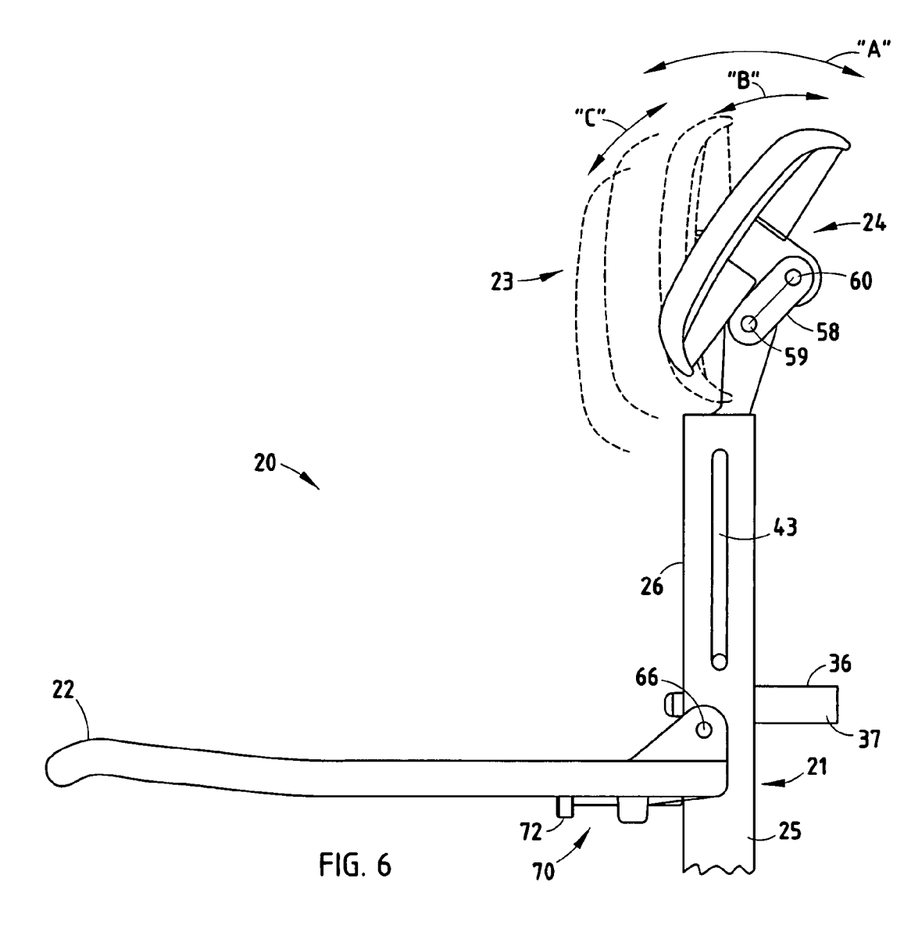
FIG. 6 is a side view of FIG. 2 showing angular adjustment of the back support.

The back support 23 is operably pivoted to a top of the upper part 41 of the upright 25 by a link mechanism 24. The linage design allows the back rest to automatically adjust with an articulated movement as closely as possible to any tree trunk. This has been tested and determined to be a surprisingly and unexpectedly comfortable design. More specifically, the double-pivot link mechanism 24 allows the top portion of the back rest 23 to adjust and move both angularly and linearly into contact with the front surface of the tree, which in turn causes the back rest 23 to move to a very comfortable, well-supported position against a tree trunk. The illustrated link mechanism 24 (FIG. 4) includes right and left flat links 58 that engage right and left side surfaces of the top of the upright 25 and right and left side surfaces of the mount 53 on the back support 23. A threaded pivot pin 59 extends through aligned holes in the links 58 and the mount 53, and a nut is tightened on the pin 59 until a proper level of friction is generated to hold the back support 23 in a selected angular orientation. It is contemplated that the proper level of friction will permit angular adjustment of the back support 23 upon application of sufficient torque. Alternatively, a threaded member and nut similar to the components 44 and 45 can be used. Similarly, a threaded pivot pin 60 extends through aligned holes in the links 58 and the upper part 41 of the upright 25, and a nut is tightened on the pin 60 until a proper level of friction is generated to hold the back support 23 in a selected angular orientation. Again, it is desired that the proper level of tension permit angular adjustment of the back support 23 upon application of sufficient torque. It is noted that the proper torsional tension can be achieved in a number of different ways in addition to proper tension on the pivot pins 59 and 60, such as by use of one or more wave-shape washers, springs, friction-causing materials such as rubber or plastic sheet or grit or silicon, detent-forming undulating surfaces that matingly engage, and in other ways known in the public. The pivot pins 59 and 60 provide a parallel pair of axes about which the back support 23 can be rotatingly angularly adjusted with an articulated motion. (Compare FIGS. 5, 6, and 7.) Notably, the number of adjustable positions of the back support 23 are infinite, and include a variety of vertical, fore/aft, and angular adjusted positions that can be achieved solely through use of the pivoting link mechanism 24. For example, arrow "A" (FIG. 6) illustrates pivoting about pivot pin 59, arrow "B" illustrates pivoting about pivot pin 60, and arrow "C" illustrates pivoting about both pivot pins 59 and 60 while keeping the back support 23 in a vertical orientation.

The seat 22 (FIG. 5) includes a seat frame 64 with a pair of flanges 65 pivoted to the outer tube section 26 of the upright 25 by pivot pin 66. The seat frame 64 includes a perimeter flange 67 (FIG. 1), rear mount 68, and reinforcing walls 69 that rigidly interconnected the flange 67 and mount 68. An adjustment screw 70 (FIG. 5) extends through an enlarged threaded portion 71 of the perimeter flange 67 and extends into abutment with the upright 25. A knob 72 on the head of the screw 70 can be grasped and rotated to extend the screw 70. As the screw 70 extends, it forces the seat frame 64 to adjust angularly relative to horizontal. A cushion is placed on the seat frame 64 (or molded thereon) and a camouflage cover attached to cover the cushion and seat frame, and to hold the cushion on the seat frame 64.

Figure 7:
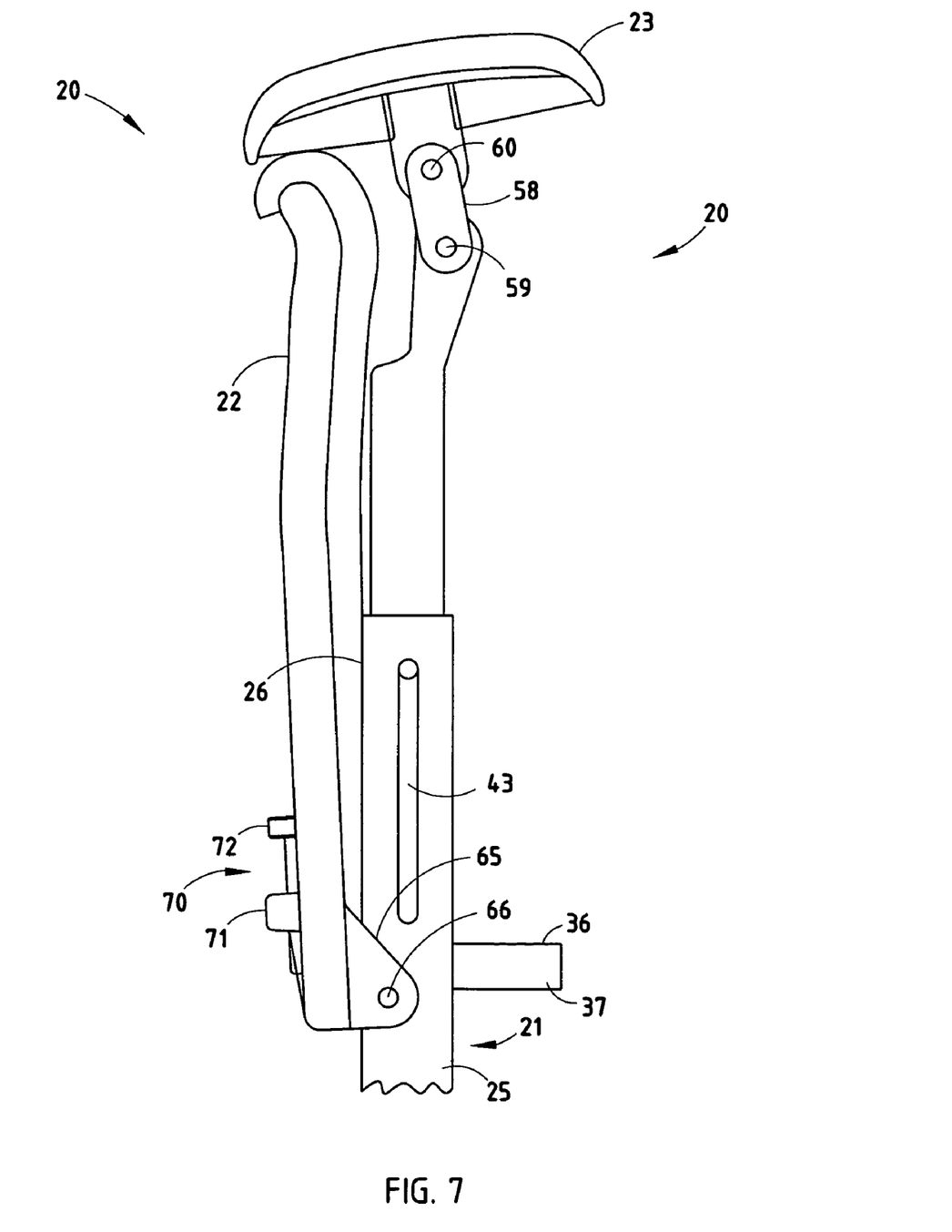
FIG. 7 is a side view of FIG. 2 showing adjustment of the back support and seat to an elevated perching position where the hunter is supported in a half-standing perched position.

The back support 23 of the tree stand 20 is also designed to act as a perch where a person is partially standing and partly supporting their weight on the back support in a fashion similar to a seat (FIG. 7). Specifically, the seat 22 is designed to pivot flat against a front surface of the upright

25. Further, the back support 23 can be pivoted so that the links 58 are primarily vertically oriented, with a front portion of the back support 23 resting on a top of the seat 22. Also, a front lower edge of the back support 23 tends to hook onto the front (top) of the seat 22, securing the assembly in the perched position. This results in a stable condition, with the front surface of the back support 23 being well-supported in a relatively horizontal orientation. Further, the back support 23 is elevated to its highest position on the upright 25 relative to the foot platform (28). The net result is a stable condition, with the back support 23 being in a position where the hunter can rest in a partial-standing position, commonly referred to as a "perched" position. In the perched position, the hunter rests part of his/her body weight on the back support 23 (i.e. using it as a seat), but also supports part of his/her body weight with his/her own feet and legs. In the perched position, the hunter stands on the foot platform 28 with about 30% to 80% of his/her weight being on the back support 25 and the remaining weight on his/her feet and legs.

Figure 8:
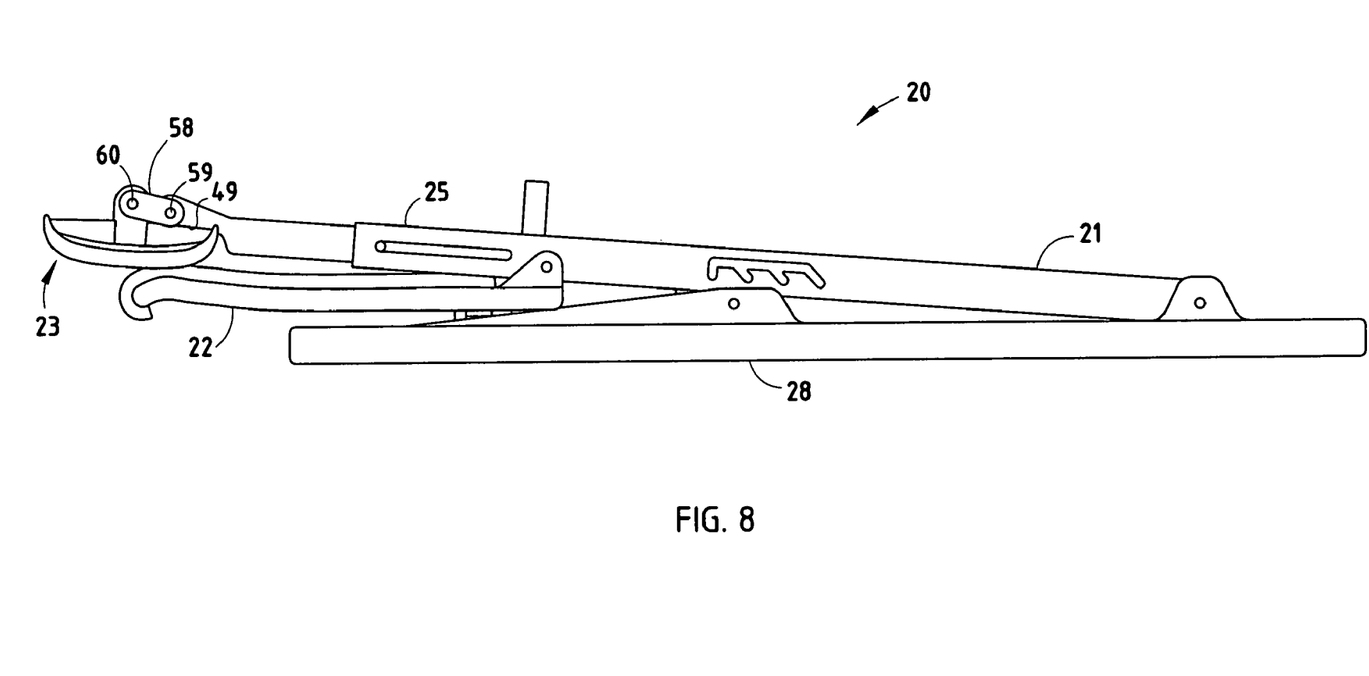
FIG. 8 is a side view of FIG. 2 showing the tree stand folded to a flat storage and transport position.

The tree stand 20 (FIG. 8) can also be folded to a flat, compact, storage position (FIG. 8). Specifically, the back support 23 fits into the recess 49 such that the back support 23 does not interfere with the seat 22 being folded flat against the upright 25. Thereafter, the foot platform 28 folds flat against the underside of the seat 22. The resulting package is relatively compact and well-balanced, allowing it to be easily handled and stored, and allowing it to be placed in (or removed from) a tree.

A second tree stand 20A includes components, features, and aspects similar or identical to the tree stand 20. the similar and identical components, features, and aspects are identified using the same identification numbers, but with the addition of the letter "A". This is done to reduce redundant discussion, and to facilitate an understanding of broader aspects of the present invention, and not for another purpose.

It is specifically contemplated that even if a back support having a front shape similar to back support 23 is adjustably supported on a tree trunk instead of on the frame 21, such as by tying or strapping the back support to the tree trunk, the present inventive concepts are broad enough to include such an arrangement.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A tree stand comprising:
   a frame adapted to stably engage a tree trunk at an elevated position, the frame including an upright;
   a seat on the frame; and
   a back support supported on the upright, the upright including an upper section defining a recess into which the back support fits so that, when the back support is in the recess, a front center surface of the back support generally aligns with a front surface of the upright, wherein the upright is telescopingly adjustable for vertically adjusting a position of the back support.

2. The tree stand defined in claim 1, including a mechanism that frictionally adjustably attaches the back support to the frame, and that permits the back support to automatically adjust and move rearward into abutment with a tree trunk upon application of a rearward force on the back support.

3. The tree stand defined in claim 2, wherein the mechanism includes a link that is frictional and permits the back support to automatically move rearward into abutment with a tree trunk upon application of a rearward force on the back support.

4. The tree stand defined in claim 1, wherein the back support is rotatable to a forwardly-facing vertical position relative to the seat for supporting a seated user in a seated position and is further rotatable to an upwardly-facing horizontal position relative to the seat for supporting a seated user in a partial-standing perched position.

5. The tree stand defined in claim 1, wherein the back support includes a lumbar-supporting section adapted to engage and support a lumbar region of a user's back, the lumbar-supporting section having a front surface with a concavely-shaped horizontal cross section and a convexly-shaped vertical cross section.

6. The tree stand defined in claim 1, wherein the back support has a vertical dimension of not greater than about 6 inches, and extends at least as high as a top of the frame.

7. The tree stand defined in claim 1, wherein the back support is pivoted to the frame and is constructed to fold against the frame, and wherein the seat is also pivoted to the frame and constructed to fold generally flat against the back support and frame for compact storage.

8. The tree stand defined in claim 1, wherein back support includes a back frame, a cushion on the frame, and a covering enclosing the cushion and the back frame.

9. The tree stand defined in claim 1, wherein the seat is pivoted to the frame, and including an adjuster on one of the seat and the frame for angularly adjusting the seat.

10. The tree stand defined in claim 1, including a foot platform on the frame adapted to support a hunter's legs and feet.

11. The tree stand defined in claim 1, wherein the back support is pivotally supported on the upright for angular adjustment.

12. The tree stand defined in claim 1, wherein the back support is horizontally adjustable in a rearward direction.

13. The tree stand defined in claim 1, wherein the back support includes a link mechanism pivotally supporting the back support on the upright, the link mechanism defining a pair of parallel axes, the back support being pivotally adjustable about each one of the parallel axes.

* * * * *